(12) United States Patent
Jo

(10) Patent No.: US 10,778,922 B2
(45) Date of Patent: Sep. 15, 2020

(54) OPTICAL SYSTEM

(71) Applicant: SAMSUNG ELECTRO-MECHANICS CO., LTD., Suwon-Si (KR)

(72) Inventor: Yong Joo Jo, Suwon-Si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 290 days.

(21) Appl. No.: 14/679,428

(22) Filed: Apr. 6, 2015

(65) Prior Publication Data

US 2016/0131899 A1 May 12, 2016

(30) Foreign Application Priority Data

Nov. 11, 2014 (KR) .......................... 10-2014-0156332

(51) Int. Cl.
| | |
|---|---|
| H04N 5/376 | (2011.01) |
| G02B 5/00 | (2006.01) |
| G02B 13/00 | (2006.01) |

(52) U.S. Cl.
CPC ............. *H04N 5/376* (2013.01); *G02B 5/005* (2013.01); *G02B 13/0045* (2013.01)

(58) Field of Classification Search
CPC ....... G02B 13/0045; G02B 13/04; G02B 9/62
See application file for complete search history.

(56) References Cited

U.S. PATENT DOCUMENTS

| | | |
|---|---|---|
| 7,564,634 B2 | 7/2009 | Lin et al. |
| 9,341,822 B2 | 5/2016 | Kubota et al. |
| 2009/0059395 A1* | 3/2009 | Lin .......................... G02B 9/62 359/761 |

(Continued)

FOREIGN PATENT DOCUMENTS

| | | |
|---|---|---|
| CN | 101377562 A | 3/2009 |
| CN | 204229035 U | 3/2015 |

(Continued)

OTHER PUBLICATIONS

Korean Office Action dated Jul. 1, 2016 in counterpart Korean Application No. 10-2014-0156332 (8 pages in English, 7 pages in Korean).

(Continued)

*Primary Examiner* — Cara E Rakowski
(74) *Attorney, Agent, or Firm* — NSIP Law

(57) ABSTRACT

An optical system includes a first lens having refractive power; a second lens having refractive power, both surfaces thereof being convex in a paraxial region; a third lens having refractive power and having an object-side surface that is convex in the paraxial region; a fourth lens having refractive power; a fifth lens having refractive power and having an image-side surface that is concave in the paraxial region; and a sixth lens having refractive power, wherein the first to sixth lenses are sequentially disposed from an object side, and when an Abbe number of the first lens is v1 and an Abbe number of the second lens is v2, |v1−v2|<10 is satisfied, whereby an aberration improvement effect can be increased, and high resolution in images captured thereby can be realized while an amount of light incident through the lenses to an image sensor can be increased.

19 Claims, 20 Drawing Sheets

(56) References Cited

U.S. PATENT DOCUMENTS

| | | |
|---|---|---|
| 2014/0078603 A1 | 3/2014 | You |
| 2015/0029599 A1 | 1/2015 | Huang |
| 2015/0131172 A1* | 5/2015 | Park .................. G02B 9/62 |
| | | 359/759 |
| 2015/0319389 A1 | 11/2015 | Huang |
| 2016/0004042 A1* | 1/2016 | Kubota ............. G02B 13/0045 |
| | | 359/713 |
| 2016/0054543 A1 | 2/2016 | Nabeta |

FOREIGN PATENT DOCUMENTS

| | | |
|---|---|---|
| KR | 10-2009-0131805 A | 12/2009 |
| KR | 10-2010-0001525 A | 1/2010 |
| KR | 10-2014-0035810 A | 3/2014 |
| KR | 10-2014-0035829 A | 3/2014 |
| TW | 201344237 A | 11/2013 |
| TW | 201432298 A | 8/2014 |
| WO | WO 2014/162779 A1 | 10/2014 |

OTHER PUBLICATIONS

Taiwanese Office Action dated Dec. 8, 2015, in counterpart to Taiwanese Application No. 104112156 (5 pages in English; 5 pages in Taiwanese).

Korean Office Action dated Jan. 4, 2016 in counterpart Korean Application No. 10-2014-0156332 (5 pages in English; 4 pages in Korean).

Chinese Office Action dated Mar. 29, 2018 in corresponding Chinese Patent Application No. 201510222351.1 (11 pages in English and 8 pages in Chinese).

* cited by examiner

| Surface | Radius | Thickness | index | abbe |
|---|---|---|---|---|
| object | Infinity | Infinity | | |
| 1 | 1.92614 | 0.441836 | 1.5441 | 55 |
| 2 | 3.23575 | 0.143316 | | |
| 3 | 2.70758 | 0.464953 | 1.5441 | 55 |
| 4 | -10.60431 | 0.1 | | |
| Stop | Infinity | 0.1 | | |
| 5 | 9.12448 | 0.25 | 1.639 | 23 |
| 6 | 2.02909 | 0.355435 | | |
| 7 | -13.31699 | 0.506678 | 1.639 | 23 |
| 8 | -5.97806 | 0.532042 | | |
| 9 | -55.93573 | 0.704006 | 1.639 | 23 |
| 10 | 200 | 0.101579 | | |
| 11 | 3.01618 | 0.804435 | 1.535 | 55 |
| 12 | 1.70313 | 0.245939 | | |
| 13 | Infinity | 0.4 | 1.517 | 64.2 |
| 14 | Infinity | 0.328907 | | |
| Image | Infinity | 0.020874 | | |

FIG. 3

| surface# | 1 | 2 | 3 | 4 | 5 | 6 |
|---|---|---|---|---|---|---|
| Conic Constant (K) | -0.517315 | -0.136861 | 1.291338 | 0 | 53.474149 | -6.675805 |
| 4th Order Coefficient (A) | -0.00581807 | -0.0244707 | -0.0416561 | 0.0243977 | -0.0503817 | 0.0220808 |
| 6th Order Coefficient (B) | 0.0120352 | -0.0517665 | 0.0448595 | -0.14483 | 0.183839 | 0.18306 |
| 8th Order Coefficient (C) | -0.0522099 | 0.184547 | -0.189702 | 0.44826 | -0.776184 | -0.625183 |
| 10th Order Coefficient (D) | 0.0852661 | -0.331408 | 0.458189 | -0.874434 | 2.03562 | 1.42116 |
| 12th Order Coefficient (E) | -0.0796142 | 0.354383 | -0.570349 | 0.971097 | -3.0409 | -1.88691 |
| 14th Order Coefficient (F) | 0.039934 | -0.193367 | 0.381006 | -0.549157 | 2.38054 | 1.3487 |
| 16th Order Coefficient (G) | -0.00855276 | 0.0404525 | -0.107953 | 0.11879 | -0.758826 | -0.395679 |
| surface# | 7 | 8 | 9 | 10 | 11 | 12 |
| Conic Constant (K) | -209.715656 | 0 | -105.698143 | 2.120412 | -13.452225 | -6.21733 |
| 4th Order Coefficient (A) | -0.0742973 | -0.0382576 | 0.0320775 | 0.0438304 | -0.072165 | -0.0638354 |
| 6th Order Coefficient (B) | -0.0266294 | -0.0514116 | -0.0813123 | -0.0508206 | 0.0233255 | 0.0253187 |
| 8th Order Coefficient (C) | 0.167653 | 0.167779 | 0.0623298 | 0.0241936 | -0.00317616 | -0.00853403 |
| 10th Order Coefficient (D) | -0.241259 | -0.200892 | -0.0267562 | -0.00677891 | -0.000951617 | 0.00141746 |
| 12th Order Coefficient (E) | 0.181357 | 0.14736 | 0.00601551 | 0.000884354 | 0.000474316 | -9.31812E-05 |
| 14th Order Coefficient (F) | -0.0638391 | -0.0598343 | -0.000542147 | -1.45706E-05 | -6.78673E-05 | 8.07106E-07 |
| 16th Order Coefficient (G) | 0 | 0.00969891 | 0 | -4.6473E-06 | 3.16897E-06 | 6.40882E-08 |

FIG. 4

| Surface | Radius | Thickness | index | abbe |
|---|---|---|---|---|
| object | Infinity | Infinity | | |
| 1 | 1.91814 | 0.440323 | 1.5441 | 55 |
| 2 | 3.19891 | 0.142261 | | |
| 3 | 2.67448 | 0.456588 | 1.5441 | 55 |
| 4 | -11.10268 | 0.1 | | |
| Stop | Infinity | 0.1 | | |
| 5 | 9.0405 | 0.25 | 1.639 | 23 |
| 6 | 2.04166 | 0.352425 | | |
| 7 | -12.99675 | 0.496855 | 1.639 | 23 |
| 8 | -5.71913 | 0.548857 | | |
| 9 | -81.3144 | 0.654173 | 1.639 | 23 |
| 10 | 200 | 0.1 | | |
| 11 | 2.9506 | 0.787490 | 1.535 | 55 |
| 12 | 1.64512 | 0.248216 | | |
| 13 | Infinity | 0.4 | 1.517 | 64.2 |
| 14 | Infinity | 0.310531 | | |
| Image | Infinity | 0.01249 | | |

FIG. 7

| surface# | 1 | 2 | 3 | 4 | 5 | 6 |
|---|---|---|---|---|---|---|
| Conic Constant (K) | -0.522325 | -0.1292 | 1.300756 | 0 | 53.474149 | -6.643351 |
| 4th Order Coefficient (A) | -0.00465215 | -0.0238878 | -0.042349 | 0.0281407 | -0.0505589 | 0.0161624 |
| 6th Order Coefficient (B) | 0.00509132 | -0.0605007 | 0.0535874 | -0.180124 | 0.210329 | 0.251776 |
| 8th Order Coefficient (C) | -0.0346757 | 0.230168 | -0.231559 | 0.598031 | -0.965801 | -0.942323 |
| 10th Order Coefficient (D) | 0.0612727 | -0.449112 | 0.564182 | -1.22944 | 2.6151 | 2.18783 |
| 12th Order Coefficient (E) | -0.0622869 | 0.513114 | -0.722048 | 1.43319 | -3.95455 | -2.90873 |
| 14th Order Coefficient (F) | 0.034023 | -0.299356 | 0.498734 | -0.851195 | 3.10875 | 2.06231 |
| 16th Order Coefficient (G) | -0.00791944 | 0.0679886 | -0.146282 | 0.194279 | -0.990655 | -0.599502 |
| surface# | 7 | 8 | 9 | 10 | 11 | 12 |
| Conic Constant (K) | -209.715656 | 0 | -105.698143 | 2.120412 | -13.452225 | -6.217334 |
| 4th Order Coefficient (A) | -0.0699723 | -0.0379461 | 0.0311582 | 0.0452372 | -0.0721378 | -0.0617183 |
| 6th Order Coefficient (B) | -0.0532525 | -0.0530901 | -0.0780009 | -0.0518935 | 0.023412 | 0.024521 |
| 8th Order Coefficient (C) | 0.250992 | 0.172386 | 0.0591858 | 0.0248631 | -0.00334465 | -0.00799124 |
| 10th Order Coefficient (D) | -0.386868 | -0.204045 | -0.0252286 | -0.007035310 | -0.000832574 | 0.00116244 |
| 12th Order Coefficient (E) | 0.30774 | 0.144098 | 0.0056624 | 0.000934927 | 0.000433017 | -3.97663E-05 |
| 14th Order Coefficient (F) | -0.106203 | -0.054612 | -0.000512069 | -1.85014E-05 | -6.10793E-05 | -4.28232E-06 |
| 16th Order Coefficient (G) | 0 | 0.00790959 | 0 | -4.6454E-06 | 2.74576E-06 | 2.45528E-07 |

FIG. 8

| Surface | Radius | Thickness | index | abbe |
|---|---|---|---|---|
| object | Infinity | Infinity | | |
| 1 | 1.93601 | 0.420667 | 1.5441 | 55 |
| 2 | 3.13388 | 0.124536 | | |
| 3 | 2.7062 | 0.456421 | 1.5441 | 55 |
| 4 | -10.24799 | 0.1 | | |
| Stop | Infinity | 0.1 | | |
| 5 | 8.5551 | 0.25 | 1.639 | 23 |
| 6 | 2.00927 | 0.316743 | | |
| 7 | -17.87436 | 0.457351 | 1.535 | 55 |
| 8 | -5.57698 | 0.545805 | | |
| 9 | -172.26464 | 0.778989 | 1.639 | 23 |
| 10 | 200 | 0.1 | | |
| 11 | 2.78501 | 0.811293 | 1.535 | 55 |
| 12 | 1.59629 | 0.280489 | | |
| 13 | Infinity | 0.4 | 1.517 | 64.2 |
| 14 | Infinity | 0.260569 | | |
| Image | Infinity | -0.002861 | | |

FIG. 11

| surface# | 1 | 2 | 3 | 4 | 5 | 6 |
|---|---|---|---|---|---|---|
| Conic Constant (K) | -0.55684 | -0.149235 | 1.313945 | 0 | 52.36568 | -6.432791 |
| 4th Order Coefficient (A) | -0.00514033 | -0.0235396 | -0.0385906 | 0.0239844 | -0.0348268 | 0.0357888 |
| 6th Order Coefficient (B) | -0.00179072 | -0.0724025 | 0.0271963 | -0.139266 | 0.067336 | 0.105654 |
| 8th Order Coefficient (C) | -0.00150485 | 0.299039 | -0.112821 | 0.461125 | -0.362003 | -0.393634 |
| 10th Order Coefficient (D) | -0.00831074 | -0.645246 | 0.251252 | -1.06895 | 1.15138 | 1.01339 |
| 12th Order Coefficient (E) | 0.00900494 | 0.796123 | -0.283865 | 1.46489 | -1.97744 | -1.49322 |
| 14th Order Coefficient (F) | -0.0008819225 | -0.492688 | 0.200503 | -1.04474 | 1.74963 | 1.17879 |
| 16th Order Coefficient (G) | -0.00167679 | 0.117042 | -0.0696184 | 0.296814 | -0.626894 | -0.379765 |
| surface# | 7 | 8 | 9 | 10 | 11 | 12 |
| Conic Constant (K) | -244.351278 | 0 | -22029200000 | -176305.8499 | -12.601829 | -6.210768 |
| 4th Order Coefficient (A) | -0.0762304 | -0.0406401 | 0.0361522 | 0.0371179 | -0.0776205 | -0.0477289 |
| 6th Order Coefficient (B) | -0.00578675 | -0.0393878 | -0.0790197 | -0.0478569 | 0.0262899 | 0.0119773 |
| 8th Order Coefficient (C) | 0.105033 | 0.134142 | 0.0591714 | 0.0233622 | -0.00474575 | 0.000143003 |
| 10th Order Coefficient (D) | -0.129268 | -0.139644 | -0.024444 | -0.00664764 | -0.000570045 | -0.00144145 |
| 12th Order Coefficient (E) | 0.0809445 | 0.0938014 | 0.00524684 | 0.000901645 | 0.000461001 | 0.00039067 |
| 14th Order Coefficient (F) | -0.029563 | -0.0362157 | -0.000450293 | -2.60305E-05 | -7.46807E-05 | -4.00459E-05 |
| 16th Order Coefficient (G) | 0 | 0.0050988 | 0 | -3.31705E-06 | 0.000003841 | 1.44079E-06 |

FIG. 12

| Surface | Radius | Thickness | index | abbe |
|---|---|---|---|---|
| object | Infinity | Infinity | | |
| 1 | 1.92363 | 0.425102 | 1.5441 | 55 |
| 2 | 3.15638 | 0.124226 | | |
| 3 | 2.70245 | 0.452777 | 1.5441 | 55 |
| 4 | -10.7074 | 0.1 | | |
| Stop | Infinity | 0.1 | | |
| 5 | 8.60964 | 0.25 | 1.639 | 23 |
| 6 | 2.02612 | 0.320863 | | |
| 7 | -16.44225 | 0.449371 | 1.535 | 55 |
| 8 | -5.78339 | 0.532643 | | |
| 9 | -656.34288 | 0.789216 | 1.639 | 23 |
| 10 | 200 | 0.1 | | |
| 11 | 2.88638 | 0.82242 | 1.535 | 55 |
| 12 | 1.64402 | 0.26826 | | |
| 13 | Infinity | 0.4 | 1.517 | 64.2 |
| 14 | Infinity | 0.256602 | | |
| Image | Infinity | 0.00852 | | |

FIG. 15

| surface# | 1 | 2 | 3 | 4 | 5 | 6 |
|---|---|---|---|---|---|---|
| Conic Constant (K) | -0.546046 | -0.113812 | 1.3124 | 0 | 53.474149 | -6.443346 |
| 4th Order Coefficient (A) | -0.0041371 | -0.023574 | -0.0346126 | 0.0221546 | -0.0261475 | 0.0444052 |
| 6th Order Coefficient (B) | -0.0071964 | -0.069545 | 0.0003258 | -0.119325 | 0.00216189 | 0.0463155 |
| 8th Order Coefficient (C) | 0.0183824 | 0.277024 | -0.0219117 | 0.358272 | -0.0854293 | -0.175229 |
| 10th Order Coefficient (D) | -0.0483382 | -0.589398 | 0.0690574 | -0.802171 | 0.466216 | 0.524814 |
| 12th Order Coefficient (E) | 0.0532958 | 0.72901 | -0.0696967 | 1.09237 | -0.984607 | -0.832354 |
| 14th Order Coefficient (F) | -0.025511 | -0.451811 | 0.0672312 | -0.774519 | 0.980145 | 0.692638 |
| 16th Order Coefficient (G) | 0.00373657 | 0.106665 | -0.0361617 | 0.216709 | -0.381719 | -0.231151 |
| surface# | 7 | 8 | 9 | 10 | 11 | 12 |
| Conic Constant (K) | -209.715656 | 0 | -105.698143 | 2.120412 | -13.452225 | -6.135754 |
| 4th Order Coefficient (A) | -0.0785229 | -0.0430762 | 0.0366563 | 0.0335141 | -0.0776562 | -0.0496882 |
| 6th Order Coefficient (B) | 0.0132973 | -0.0230171 | -0.0862688 | -0.0472979 | 0.0264348 | 0.011016 |
| 8th Order Coefficient (C) | 0.0278519 | 0.0905734 | 0.0661534 | 0.023022 | -0.0047824 | 0.00119844 |
| 10th Order Coefficient (D) | -0.0166366 | -0.0917048 | -0.0282198 | -0.00650818 | -0.000590657 | -0.00175829 |
| 12th Order Coefficient (E) | 0.0115737 | 0.0707677 | 0.00628253 | 0.000879458 | 0.00047093 | 0.000429184 |
| 14th Order Coefficient (F) | -0.0160289 | -0.0323388 | -0.000560407 | -2.65584E-05 | -0.000076563 | -4.17699E-05 |
| 16th Order Coefficient (G) | 0 | 0.00519987 | 0 | -3.04356E-06 | 3.98843E-06 | 1.44668E-06 |

FIG. 16

| Surface | Radius | Thickness | index | abbe |
|---|---|---|---|---|
| object | Infinity | Infinity | | |
| 1 | 1.92746 | 0.422243 | 1.5441 | 55 |
| 2 | 3.14608 | 0.123489 | | |
| 3 | 2.71847 | 0.452566 | 1.5441 | 55 |
| 4 | -10.35314 | 0.1 | | |
| Stop | Infinity | 0.1 | | |
| 5 | 8.55546 | 0.25 | 1.639 | 23 |
| 6 | 2.02354 | 0.318138 | | |
| 7 | -16.58497 | 0.443877 | 1.535 | 55 |
| 8 | -5.60291 | 0.537207 | | |
| 9 | -9101.74327 | 0.809013 | 1.639 | 23 |
| 10 | 100 | 0.100344 | | |
| 11 | 2.85476 | 0.820544 | 1.535 | 55 |
| 12 | 1.62013 | 0.272857 | | |
| 13 | Infinity | 0.4 | 1.517 | 64.2 |
| 14 | Infinity | 0.240935 | | |
| Image | Infinity | 0.008785 | | |

FIG. 19

| surface# | 1 | 2 | 3 | 4 | 5 | 6 |
|---|---|---|---|---|---|---|
| Conic Constant (K) | -0.554528 | -0.111745 | 1.318983 | 0 | 53.31361 | -6.423021 |
| 4th Order Coefficient (A) | -0.0043261 | -0.0235664 | -0.0345448 | 0.0220269 | -0.0261848 | 0.0444605 |
| 6th Order Coefficient (B) | -0.00727599 | -0.0695291 | 0.000367369 | -0.119407 | 0.00202756 | 0.0462597 |
| 8th Order Coefficient (C) | 0.0183412 | 0.277054 | -0.0218963 | 0.358196 | -0.0855905 | -0.175369 |
| 10th Order Coefficient (D) | -0.0483629 | -0.589368 | 0.0690561 | -0.802241 | 0.466052 | 0.524611 |
| 12th Order Coefficient (E) | 0.0532817 | 0.729028 | -0.0697087 | 1.09232 | -0.984767 | -0.832578 |
| 14th Order Coefficient (F) | -0.0255173 | -0.451813 | 0.0672111 | -0.774517 | 0.980145 | 0.692638 |
| 16th Order Coefficient (G) | 0.00373614 | 0.106639 | -0.0361627 | 0.216711 | -0.381719 | -0.231151 |
| surface# | 7 | 8 | 9 | 10 | 11 | 12 |
| Conic Constant (K) | -225.142755 | 0 | 76355.69345 | 1880.500502 | -13.880985 | -6.179334 |
| 4th Order Coefficient (A) | -0.0781182 | -0.0424541 | 0.0369129 | 0.032924 | -0.0775934 | -0.0492597 |
| 6th Order Coefficient (B) | 0.0137451 | -0.0231325 | -0.0861874 | -0.0472157 | 0.0264718 | 0.0110265 |
| 8th Order Coefficient (C) | 0.0280007 | 0.0905732 | 0.0661687 | 0.0230321 | -0.004778 | 0.00119719 |
| 10th Order Coefficient (D) | -0.0166385 | -0.0916715 | -0.0282167 | -0.0065073 | -0.00059048 | -0.00175829 |
| 12th Order Coefficient (E) | 0.0115961 | 0.0707754 | 0.00628323 | 0.000879563 | 0.000470907 | 0.000429197 |
| 14th Order Coefficient (F) | -0.0160289 | -0.0323607 | -0.00056025 | -2.65357E-05 | 7.65692E-05 | -4.17676E-05 |
| 16th Order Coefficient (G) | 0 | 0.00516191 | 0 | -3.03736E-06 | 3.98734E-06 | 0.00000 1447 |

FIG. 20

OPTICAL SYSTEM

CROSS-REFERENCE TO RELATED APPLICATION

This application claims the priority and benefit under 35 USC § 119 of Korean Patent Application No. 10-2014-0156332 filed on Nov. 11, 2014, with the Korean Intellectual Property Office, the disclosure of which is incorporated herein by reference.

BACKGROUND

1. Field

The present disclosure relates to an optical system.

2. Description of Related Art

Mobile communications terminals may include camera modules to allow users to make video calls and to capture still and moving images. In addition, as the degree of functionality of the camera modules included in the mobile communications terminals has gradually increased, a demand exists for the camera modules for the mobile communications terminals to include high levels of resolution and high degrees of performance.

However, as a result of an existing trend of reducing a size and weight of the mobile communications terminals, limitations exists in configuring camera modules to have high levels of resolution and high degrees of performance.

In order to overcome the limitations in resolution and performance of existing camera modules, an optical system is needed in which an aberration effect is improved, and an amount of light incident through lenses to an image sensor increases to improve resolution of an image or images being captured.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an illustrative example, there is provided an optical system, including a first lens; a second lens comprising an object-side surface and an image-side surface, both being convex in a paraxial region; a third lens comprising an object-side surface that is convex in the paraxial region; a fourth lens; a fifth lens comprising an image-side surface that is concave in the paraxial region; and a sixth lens, wherein the first to sixth lenses are sequentially disposed from an object side to an image side, and wherein, v1, an Abbe number of the first lens, and, v2, an Abbe number of the second lens satisfy $|v1-v2|<10$.

The optical system may also include a stop disposed between the second and third lenses, wherein, SD, a radius of the stop and, f, an overall focal length of the optical system including the first to sixth lenses satisfy $SD/f<0.4$.

The optical system may also include r9, a radius of curvature of an object-side surface of the fifth lens and, r10, a radius of curvature of the image-side surface of the fifth lens may satisfy r10, $-30<(r9-r10)/(r9+r10)<3$.

The optical system may also include an image sensor converting an image incident through the first to sixth lenses into an electrical signal, wherein TTL is a distance from an object-side surface of the first lens to an imaging surface of the image sensor and f is an overall focal length of the optical system including the first to sixth lenses satisfying $TTL/f<1.35$.

The optical system may also include f, an overall focal length of the optical system including the first to sixth lenses and, f1, a focal length of the first lens that satisfy $0.4<f/f1<0.7$.

The optical system may also include f, an overall focal length of the optical system including the first to sixth lenses and, f2, a focal length of the second lens that satisfy $1.0<f/f2<1.3$.

The optical system may also include f, an overall focal length of the optical system including the first to sixth lenses and, f3, a focal length of the third lens that satisfy $1.0<|f/f3|<1.2$.

The optical system may also include f, an overall focal length of the optical system including the first to sixth lenses and, f4, a focal length of the fourth lens that satisfy $0.2<f/f4<0.4$.

The optical system may also include f, an overall focal length of the optical system including the first to sixth lenses and, f5, a focal length of the fifth lens that satisfy $0.01<|f/f5|<0.07$.

The optical system may also include f, an overall focal length of the optical system including the first to sixth lenses and, f6, a focal length of the sixth lens that satisfy $0.4<|f/f6|<0.6$.

The optical system may also include f1, a focal length of the first lens and, f2, a focal length of the second lens that satisfy $1.9<f1/f2<2.1$.

The optical system may also include f4, a focal length of the fourth lens and, f5, a focal length of the fifth lens that satisfy $4.0<|f5/f4|<15$.

The optical system may also include f, an overall focal length of the optical system including the first to sixth lenses, f1, a focal length of the first lens, and, f2, a focal length of the second lens that satisfy $1.5<f/f1+f/f2<2.0$.

The optical system may also include f, an overall focal length of the optical system including the first to sixth lenses, f5, a focal length of the fifth lens, and, f6, a focal length of the sixth lens that satisfy $0.4<|f/f5|+|f/f6|<0.6$.

The optical system may also include v3, an Abbe number of the third lens that satisfies $v1-v3>30$.

The optical system may also include v3, an Abbe number of the third lens that satisfies $v2-v3>30$.

The first lens may have a positive refractive power.

An object-side surface of the first lens may be convex in the paraxial region.

An image-side surface of the first lens may be concave in the paraxial region.

The second lens may be a positive refractive power.

An absolute value of a radius of curvature of an object-side surface of the second lens in the paraxial region may be smaller than an absolute value of a radius of curvature of an image-side surface of the second lens in the paraxial region.

The third lens may be a negative refractive power.

An image-side surface of the third lens may be concave in the paraxial region.

The fourth lens may be a positive refractive power.

An object-side surface of the fourth lens may be concave in the paraxial region.

An image-side surface of the fourth lens may be convex in the paraxial region.

The fifth lens may be a negative refractive power.

An object-side surface of the fifth lens may be concave in the paraxial region.

Among the first to sixth lenses, the fifth lens may have a largest absolute value of a focal length.

An absolute value of a radius of curvature of the image-side surface of the fifth lens in the paraxial region may be larger than an absolute value of a radius of curvature of an object-side surface of the fifth lens in the paraxial region.

The fifth lens may have at least one inflection point on at least one of an object-side surface and the image-side surface thereof.

The sixth lens may have a negative refractive power.

An object-side surface of the sixth lens may be convex in the paraxial region.

An image-side surface of the sixth lens may be concave in the paraxial region.

A radius of curvature of an image-side surface of the sixth lens in the paraxial region may be smaller than a radius of curvature of an object-side surface of the sixth lens in the paraxial region.

The sixth lens may have at least one inflection point on at least one of an object-side surface and an image-side surface thereof.

At least one of an object-side surface and an image-side surface of each of the first to sixth lenses may be aspherical.

In accordance with another aspect, there is provided an optical system, including lenses sequentially arranged from an object side to an image side, wherein a fifth lens of the lenses comprises an object-side surface and an image-side surface, both being concave in a paraxial region, a sixth lens of the lenses comprises an image-side surface that is concave in the paraxial region, and an absolute difference between an Abbe number of a first lens and an Abbe number of a second lens is less than 10.

At least one inflection point may be formed on at least one of the first and second surfaces of the fifth lens, and an absolute value of a radius of curvature of a second surface of the fifth lens in the paraxial region may be larger than an absolute value of a radius of curvature of the first surface of the fifth lens in the paraxial region.

A radius of curvature of a second surface of the sixth lens in the paraxial region may be smaller than a radius of curvature of a first surface of the sixth lens in the paraxial region.

In accordance with another aspect, there is provided an optical system, including lenses sequentially arranged from an object side to an image side, wherein a first lens of the lenses comprises an object-side surface that is convex in a paraxial region, a second lens of the lenses comprises an object-side surface that is convex in the paraxial region, a fifth lens of the lenses comprises an image-side surface that is concave in the paraxial region, and an absolute difference between an Abbe number of the first lens and an Abbe number of the second lens is less than 10.

At least one inflection point may be formed on at least one of the first and second surfaces of the fifth lens, and an absolute value of a radius of curvature of a second surface of the fifth lens in the paraxial region is larger than an absolute value of a radius of curvature of the first surface of the fifth lens in the paraxial region.

In accordance with a further aspect, there is provided an optical system including lenses sequentially arranged from an object side to an image side, wherein a first lens of the lenses has a meniscus shape and comprises an object-side surface that is convex in a paraxial region and an image-side surface that is concave in the paraxial region, a second lens of the lenses comprises an object-side and image-side surfaces, each being convex in the paraxial region, and an absolute difference between an Abbe number of the first lens and an Abbe number of the second lens is less than 10.

A third lens of the lenses may include an object-side surface that is convex in the paraxial region and an image-side surface that is concave in the paraxial region, a fourth lens of the lenses may include an object-side surface that is concave in the paraxial region and an image-side surface that is convex in the paraxial region, a fifth lens of the lenses may include an object-side surface and an image-side surface, both being concave in the paraxial region, and a sixth lens of the lenses may include an object-side surface that is convex in the paraxial region and an image-side surface that is concave in the paraxial region.

The first, the second, and the fourth lenses may have a positive refractive power, and the third, the fifth and the sixth lenses may have a negative refractive power.

At least one inflection point is formed on at least one of the first and second surfaces of the fifth lens, and an absolute value of a radius of curvature of a second surface of the fifth lens in the paraxial region may be larger than an absolute value of a radius of curvature of the first surface of the fifth lens in the paraxial region.

The third, the fourth, and the sixth lenses may have a meniscus shape, and a radius of curvature of a second surface of the sixth lens in the paraxial region may be smaller than a radius of curvature of a first surface of the sixth lens in the paraxial region.

An absolute value of a radius of curvature of a first surface of the second lens in the paraxial region may be smaller than an absolute value of a radius of curvature of a second surface of the second lens in the paraxial region.

Other features and aspects will be apparent from the following detailed description, the drawings, and the claims.

BRIEF DESCRIPTION OF DRAWINGS

These and/or other aspects will become apparent and more readily appreciated from the following description of the embodiments, taken in conjunction with the accompanying drawings in which:

FIG. 3 is a table illustrating respective characteristics of lenses in the optical system illustrated in FIG. 1;

FIG. 4 is a table illustrating respective aspherical surface coefficients of lenses in the optical system illustrated in FIG. 1;

FIG. 7 is a table illustrating respective characteristics of lenses in the optical system illustrated in FIG. 5;

FIG. 8 is a table illustrating respective aspherical surface coefficients of lenses in the optical system illustrated in FIG. 5;

FIG. 11 is a table illustrating respective characteristics of lenses in the optical system illustrated in FIG. 9;

FIG. 12 is a table illustrating respective aspherical surface coefficients of lenses in the optical system illustrated in FIG. 9;

FIG. 15 is a table illustrating respective characteristics of lenses in the optical system illustrated in FIG. 13;

FIG. 16 is a table illustrating respective aspherical surface coefficients of lenses in the optical system illustrated in FIG. 13;

FIG. 19 is a table illustrating respective characteristics of lenses in the optical system illustrated in FIG. 17; and FIG. 20 is a table illustrating respective aspherical surface coefficients of lenses in the optical system illustrated in FIG. 17.

Figure 1:
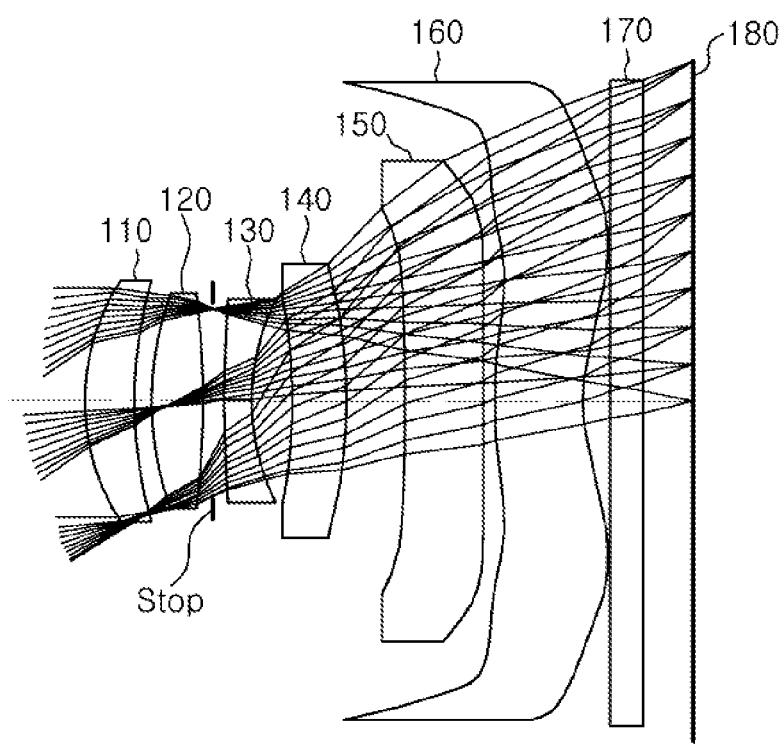
FIG. 1 is a configuration diagram of an optical system, according to a first embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or methods described herein will be apparent to one of ordinary skill in the art. For example, the sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

It will be understood that, although the terms first, second, third, etc. may be used herein to describe various lenses, these lenses should not be limited by these terms. These terms are only used to distinguish one lens from another lens. These terms do not necessarily imply a specific order or arrangement of the lenses. Thus, a first lens discussed below could be termed a second lens without departing from the teachings description of the various embodiments.

In the following lens configuration diagrams, thicknesses, sizes, and shapes of lenses may be exaggerated for clarity. Particularly, the shapes of spherical surfaces and aspherical surfaces, as illustrated in the lens configuration diagrams, are only illustrated by way of example, but are not limited to those illustrated in the drawings.

In some configurations, lenses included in lens modules are formed of plastic or polycarbonate, a material lighter than glass. In other configurations, some of the lenses included in the modules are formed of plastic or polycarbonate, and other lenses may be formed of glass. According to some configurations, a lens module may include five or more lenses in order to achieve high levels of resolution in images being captured.

In accordance with an illustrative configuration, a first lens refers to a lens closest to an object, while a sixth lens refers to a lens closest to an imaging surface.

Further, a surface of each lens closest to an object is referred to as a first surface or an object-side surface, and a surface of each lens closest to an imaging surface is referred to as a second surface or an image-side surface. Further, all numerical values of radii of curvature, thicknesses, and other parameters of the lenses are represented in millimeters (mm).

In addition, a paraxial region refers to a very narrow region in the vicinity of an optical axis. Paraxial region or space region near an axis is where the angle α between rays and optical axis is so small that sin α and tan α can be replaced with sufficient accuracy by the angle α.

In accordance with an illustrative example, the embodiments described of the optical system include six lenses. However, a person of ordinary skill in the relevant art will appreciate that the number of lenses in the optical system may vary, for example, between two to five lenses, while achieving the various results and benefits described hereinbelow.

In one example, the optical system includes a first lens, a second lens, a third lens, a fourth lens, a fifth lens, and a sixth lens.

However, the optical system is not limited to include lenses and may further include other components, if necessary. For example, the optical system may include a stop to control an amount of light. In addition, the optical system may further include an infrared cut-off filter filtering infrared light. Further, the optical system may further include an image sensor converting an image of a subject incident thereon into electrical signals. Further, the optical system may further include a gap maintaining member to adjust a gap between lenses.

The first through sixth lenses configuring the optical system, according to an embodiment, are formed of materials including glass, plastic or other similar types of polycarbonate materials. In another embodiment, at least one of the first through sixth lenses is formed of a material different from the materials forming the other first through sixth lenses.

In addition, at least one of the first to sixth lenses may have an aspherical object-side or image-side surface. Alternatively, each of the first to sixth lenses may have at least one aspherical object-side or image-side surface.

That is, at least one of first and second surfaces of the first to sixth lenses may be aspherical. In one example, the aspherical surfaces of the first to sixth lenses may be represented by the following Equation 1:

$$Z = \frac{cY^2}{1 + \sqrt{1 - (1+K)c^2 Y^2}} + AY^4 + BY^6 + CY^8 + DY^{10} + EY^{12} + FY^{14} + \ldots \quad \text{[Equation 1]}$$

In this equation, c is curvature (the inverse of a radius of curvature) at an apex of the lens, K is a conic constant, and Y is a distance from a certain point on the aspherical surface of the lens to an optical axis in a direction perpendicular to the optical axis. In addition, constants A to F refer to aspherical surface coefficients. In addition, Z is a distance between the certain point on the aspherical surface at the distance Y and a tangential plane meeting the apex of the aspherical surface of the lens.

Each of the first through sixth lenses has a refractive power, either negative or positive. For instance, in one configuration, from the object side towards the image side, the first lens has a positive refractive power, the second lens has a positive refractive power, the third lens has a negative refractive power, the fourth lens has a positive refractive power, the fifth lens has a negative refractive power, and the sixth lens has a negative refractive power. A person of ordinary skill in the relevant art will appreciate that each of the first and sixth lenses may be configured in an opposite refractive power from the configuration described above. For example, in an alternative configuration, the first lens has a positive refractive power, the second lens has a positive refractive power, the third lens has a negative refractive power, the fourth lens has a negative refractive power, the fifth lens has a positive refractive power, and the sixth lens has a negative refractive power.

The optical system configured as described above improves optical performance through aberration improvement. In addition, an increased amount of light is incident through the lenses to the image sensor while images captured thereby have high levels of resolution.

The optical system according to embodiments satisfies Conditional Expression 1.

$|v1-v2|<10$     [Conditional Expression 1]

Here, v1 is an Abbe number of the first lens, and v2 is an Abbe number of the second lens.

The optical system according to embodiments satisfies Conditional Expression 2.

$SD/f<0.4$     [Conditional Expression 2]

Here, SD is a radius of the stop, and f is an overall focal length of the optical system.

The optical system according to embodiments satisfies Conditional Expression 3.

$30<(r9-r10)/(r9+r10)<3$     [Conditional Expression 3]

Here, r9 is a radius of curvature of an object-side surface of the fifth lens, and r10 is a radius of curvature of an image-side surface of the fifth lens.

The optical system according to embodiments satisfies Conditional Expression 4.

$TTL/f<1.35$     [Conditional Expression 4]

Here, TTL is a distance from an object-side surface of the first lens to an imaging surface of the image sensor, and f is the overall focal length of the optical system.

The optical system according to embodiments satisfies Conditional Expression 5.

$0.4<f/f1<0.7$     [Conditional Expression 5]

Here, f is the overall focal length of the optical system, and f1 is a focal length of the first lens.

The optical system according to embodiments satisfies Conditional Expression 6.

$1.0<f/f2<1.3$     [Conditional Expression 6]

Here, f is the overall focal length of the optical system, and f2 is a focal length of the second lens.

The optical system according to embodiments satisfies Conditional Expression 7.

$1.0<|f/f3|<1.2$     [Conditional Expression 7]

Here, f is the overall focal length of the optical system, and f3 is a focal length of the third lens.

The optical system according to embodiments satisfies Conditional Expression 8.

$0.2<f/f4<0.4$     [Conditional Expression 8]

Here, f is the overall focal length of the optical system, and f4 is a focal length of the fourth lens.

The optical system according to embodiments satisfies Conditional Expression 9.

$0.01<|f/f5|<0.07$     [Conditional Expression 9]

Here, f is the overall focal length of the optical system, and f5 is a focal length of the fifth lens.

The optical system according to embodiments satisfies Conditional Expression 10.

$0.4<|f/f6|<0.6$     [Conditional Expression 10]

Here, f is the overall focal length of the optical system, and f6 is a focal length of the sixth lens.

The optical system according to embodiments satisfies Conditional Expression 11.

$1.9<f1/f2<2.1$     [Conditional Expression 11]

Here, f1 is the focal length of the first lens, and f2 is the focal length of the second lens.

The optical system according to embodiments satisfies Conditional Expression 12.

$4<|f5/f4|<15$     [Conditional Expression 12]

Here, f5 is the focal length of the fifth lens, and f4 is the focal length of the fourth lens.

The optical system according to embodiments satisfies Conditional Expression 13.

$1.5<f/f1+f/f2<2.0$     [Conditional Expression 13]

Here, f is the overall focal length of the optical system, f1 is the focal length of the first lens, and f2 is the focal length of the second lens.

The optical system according to embodiments satisfies Conditional Expression 14.

$0.4<|f/f5|+|f/f6|<0.6$     [Conditional Expression 14]

Here, f is the overall focal length of the optical system, f5 is the focal length of the fifth lens, and f6 is the focal length of the sixth lens.

The optical system according to embodiments satisfies Conditional Expression 15.

$v1-v3>30$     [Conditional Expression 15]

Here, v1 is the Abbe number of the first lens, and v3 is an Abbe number of the third lens.

The optical system according to embodiments satisfies Conditional Expression 16.

$v2-v3>30$     [Conditional Expression 16]

Here, v2 is the Abbe number of the second lens, and v3 is the Abbe number of the third lens.

Next, the first to sixth lenses configuring the optical system, according to various embodiments will be described.

The first lens includes a positive refractive power. In addition, the first lens has a meniscus shape with an object-side surface being convex. For example, a first surface of the first lens is convex in the paraxial region, and a second surface of the first lens is concave in the paraxial region.

At least one of the first and second surfaces of the first lens is aspherical. In an example, both surfaces of the first lens may be aspherical. In another example, neither of the first and second surfaces are aspherical.

The second lens has a positive refractive power. In addition, the second lens has two convex surfaces. For example, first and second surfaces of the second lens may be convex in the paraxial region.

At least one of the first and second surfaces of the second lens is aspherical. For example, both surfaces of the second lens are aspherical. In another example, neither of the first and second surfaces of the second lens are aspherical.

In addition, in one configuration, an absolute value of a radius of curvature of an object-side surface of the second lens in the paraxial region is smaller than an absolute value of a radius of curvature of an image-side surface of the second lens in the paraxial region.

The third lens has a negative refractive power. In addition, the third lens has a meniscus shape of which an object-side surface is convex. In an example, a first surface of the third lens is convex in the paraxial region, and a second surface of the third lens may be concave in the paraxial region. In an alternative configuration, the first surface of the third lens is substantially flat.

At least one of the first and second surfaces of the third lens is aspherical. For example, both surfaces of the third lens are aspherical. In another example, neither surface of the third lens is aspherical.

The fourth lens has a positive refractive power. In one configuration, the fourth lens has a meniscus shape of which an image-side surface is convex. A first surface of the fourth lens is concave in the paraxial region, and a second surface of the fourth lens is convex in the paraxial region.

At least one of the first and second surfaces of the fourth lens is aspherical. For example, both surfaces of the fourth lens are aspherical. In another example, neither surface of the fourth lens is aspherical.

The fifth lens has a negative refractive power. In addition, both surfaces of the fifth lens are concave. For instance, the first and second surfaces of the fifth lens are concave in the paraxial region. In another illustrative configuration, the first surface of the fifth lens is concave in the paraxial region and end portions thereof are substantially flat and the second surface of the fifth lens is convex in the paraxial region.

In addition, at least one inflection point may be formed on at least one of the first and second surfaces of the fifth lens. For example, the first surface of the fifth lens is concave in the paraxial region and becomes convex at an edge thereof. In addition, the second surface of the fifth lens is concave in the paraxial region and becomes convex at an edge thereof.

Further, an absolute value of a radius of curvature of an image-side surface of the fifth lens in the paraxial region may be larger than an absolute value of a radius of curvature of an object-side surface of the fifth lens in the paraxial region.

The sixth lens has negative refractive power. In addition, the sixth lens may have a meniscus shape of which an object-side surface is convex. For example, a first surface of the sixth lens is convex in the paraxial region, and a second surface of the sixth lens is concave in the paraxial region.

At least one of the first and second surfaces of the sixth lens is aspherical. For example, both surfaces of the sixth lens are aspherical. In another example, neither surface of the sixth lens is aspherical.

In addition, at least one inflection point is formed on at least one of the first and second surfaces of the sixth lens. For example, the first surface of the sixth lens is convex in the paraxial region and becomes concave at an edge thereof. In addition, the second surface of the sixth lens is concave in the paraxial region and becomes convex at an edge thereof.

Furthermore, a radius of curvature of an image-side surface of the sixth lens in the paraxial region is smaller than a radius of curvature of an object-side surface of the sixth lens in the paraxial region.

In one embodiment, among the first to sixth lenses, the fifth lens has the largest absolute value of a focal length.

Also, in one embodiment, each of the first to sixth lenses may be separate lenses configured as described above. A distance between lenses may vary. In another embodiment, at least one of the first to sixth lenses may be operatively connected or in contact with another one of the first to sixth lenses.

In a further alternative embodiment, two or more of the lenses of the first to sixth lenses may be configured as a group and in operative connection or contact with another lens. For instance, the first, second, and third lenses may be in contact with each other as a first group lens, while the fourth, fifth, and sixth lenses are configured separate from each other and from the first group lens. In the alternative, the first, second, and third lenses may be in contact with each other as a first group lens, the fourth and the fifth lenses may be in contact with each other as a second group lens, and the sixth lens is configured separate from the first and second group lenses.

In the optical system configured as described above, of the first through sixth lenses perform an aberration correction function, whereby aberration performance is improved and high resolution in images captured thereby may be realized while an amount of light incident through the lenses to the image sensor is increased.

An optical system according to a first embodiment will be described with reference to FIGS. 1 through 4.

The optical system according to the first embodiment includes a first lens 110, a second lens 120, a third lens 130, a fourth lens 140, a fifth lens 150, and a sixth lens 160. The optical system also includes a stop, an infrared cut-off filter 170, and an image sensor 180. As illustrated in Table 1, a focal length (f1) of the first lens 110 is 7.781 mm, a focal length (f2) of the second lens 120 is 3.996 mm, a focal length (f3) of the third lens 130 is −4.095 mm, a focal length (f4) of the fourth lens 140 is 16.346 mm, a focal length (f5) of the fifth lens 150 is −67.58 mm, a focal length (f6) of the sixth lens 160 is −9.268 mm, and an overall focal length (f) of the optical system is 4.685 mm. Also, TTL, a distance from an object-side surface of the first lens 110 to an imaging surface of the image sensor 180 is 5.5. Further, Fno, which indicates how much light can pass through the lens, is 2.2. Fno is inversely proportional to the focal length of the lens and directly proportional to the diameter of the effective aperture of the lens. For a given focal length, the larger the aperture of the lens the smaller the Fno and a brighter image is produced.

TABLE 1

| | |
|---|---|
| Fno | 2.2 |
| TTL | 5.5 |
| f | 4.685 |
| f1 | 7.781 |
| f2 | 3.996 |

TABLE 1-continued

| | |
|---|---|
| f3 | −4.095 |
| f4 | 16.346 |
| f5 | −67.58 |
| f6 | −9.268 |
| Stop/f | 0.363 |
| TTL/f | 1.174 |
| (r9 − r10)/(r9 + r10) | −1.777 |

For this example, respective characteristics, such as radii of curvature, thicknesses, refractive indices, and Abbe numbers of lenses are illustrated in FIG. 3.

In the first embodiment, the first lens 110 has a positive refractive power, and has a meniscus shape of which an object-side surface is convex. For example, a first surface of the first lens 110 is convex in the paraxial region, and a second surface of the first lens 110 is concave in the paraxial region.

The second lens 120 has a positive refractive power, and both surfaces thereof are convex. For example, the first and second surfaces of the second lens 120 are convex in the paraxial region.

In addition, an absolute value of a radius of curvature of the first surface of the second lens 120 in the paraxial region is smaller than an absolute value of a radius of curvature of the second surface of the second lens 120 in the paraxial region.

The third lens 130 has a negative refractive power, and has a meniscus shape of which an object-side surface is convex. For example, a first surface of the third lens 130 is convex in the paraxial region, and a second surface of the third lens 130 is concave in the paraxial region.

The fourth lens 140 has a positive refractive power, and has a meniscus shape of an image-side surface is convex. For example, a first surface of the fourth lens 140 is concave in the paraxial region, and a second surface of the fourth lens 140 is convex in the paraxial region.

The fifth lens 150 has a negative refractive power and both surfaces thereof are concave. For example, first and second surfaces of the fifth lens 150 are concave in the paraxial region.

In addition, at least one inflection point is formed on at least one of the first and second surfaces of the fifth lens 150.

In addition, an absolute value of a radius of curvature of the second surface of the fifth lens 150 in the paraxial region is larger than an absolute value of a radius of curvature of the first surface of the fifth lens 150 in the paraxial region.

The sixth lens 160 has a negative refractive power, and has a meniscus shape of which an object-side surface is convex. For example, a first surface of the sixth lens 160 is convex in the paraxial region, and a second surface of the sixth lens 160 is concave in the paraxial region.

In addition, at least one inflection point is formed on at least one of the first and second surfaces of the sixth lens 160.

In addition, a radius of curvature of the second surface of the sixth lens 160 in the paraxial region is smaller than a radius of curvature of the first surface of the sixth lens 160 in the paraxial region.

Although FIG. 1 illustrates the sixth lens 160 to be in contact to the infrared cut-off filter 170, the sixth lens 160 may be placed at a distance from the infrared cut-off filter 170. In an alternative embodiment, the infrared cut-off filter 170 may be shaped to mirror the image-side surface or the second surface of the sixth lens 160, thereby forming an integral part of the sixth lens 160.

In accordance with an embodiment, the respective surfaces of the first to sixth lenses 110 to 160 have aspherical coefficients as illustrated in FIG. 4. However, a person of ordinary skill in the art will appreciate that some variation in the aspherical coefficients may exist without departing from the results and benefits of the present first embodiment.

In addition, among the first to sixth lenses 110 to 160, the fifth lens 150 has the largest absolute value of a focal length.

In addition, the stop is disposed between the second lens 120 and the third lens 130. In an alternative configuration, the stop may be disposed on an object side of the first lens 110, closest to the object side of the optical system. In a further alternative configuration, the stop may be disposed on the object side of the first lens 110 and is aligned along an axis perpendicular to an axial point of the object-side surface of the first lens 110.

Figure 2:
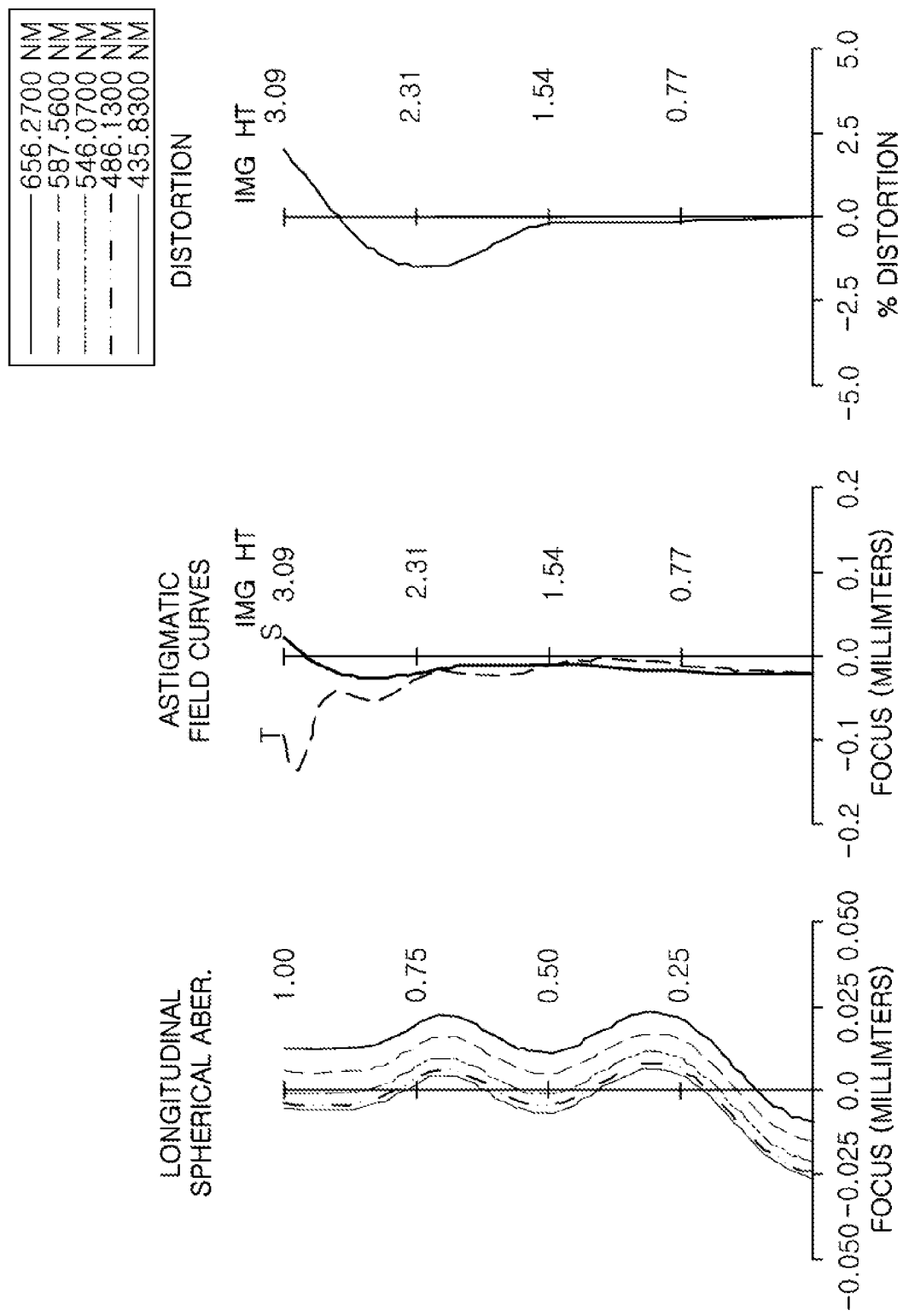
FIG. 2 is graphs having curves representing aberration characteristics of the optical system illustrated in FIG. 1.

In addition, the optical system configured as described above has aberration characteristics illustrated in FIG. 2. However, a person of ordinary skill in the art will appreciate that some variation in the aberration characteristics may exist without departing from the results and benefits of the present first embodiment.

An optical system, according to a second embodiment, will be described with reference to FIGS. 5 through 8.

The optical system, according to the second embodiment, includes a first lens 210, a second lens 220, a third lens 230, a fourth lens 240, a fifth lens 250, and a sixth lens 260. The optical system further includes a stop, an infrared cut-off filter 270, and an image sensor 280.

As illustrated in Table 2, a focal length (f1) of the first lens 210 may be 7.817 mm, a focal length (f2) of the second lens 220 may be 3.991 mm, a focal length (f3) of the third lens 230 may be −4.14 mm, a focal length (f4) of the fourth lens 240 may be 15.395 mm, a focal length (f5) of the fifth lens 250 may be −89.394 mm, a focal length (f6) of the sixth lens 260 may be −8.772 mm, and an overall focal length (f) of the optical system may be 4.589 mm. Also, TTL, a distance from an object-side surface of the first lens 210 to an imaging surface of the image sensor 280 is 5.40021. Further, Fno is 2.1.

TABLE 2

| | |
|---|---|
| Fno | 2.1 |
| TTL | 5.40021 |
| f | 4.589 |
| f1 | 7.817 |
| f2 | 3.991 |
| f3 | −4.14 |
| f4 | 15.395 |
| f5 | −89.394 |
| f6 | −8.772 |
| Stop/f | 0.363 |
| TTL/f | 1.177 |
| (r9 − r10)/(r9 + r10) | −2.37 |

In this example, respective characteristics, such as radii of curvature, thicknesses, refractive indices, and Abbe numbers of lenses are illustrated in FIG. 7.

In the second embodiment, the first lens 210 has a positive refractive power, and has a meniscus shape of which an object-side surface is convex. For example, a first surface of the first lens 210 is convex in the paraxial region, and a second surface of the first lens 210 is concave in the paraxial region.

The second lens 220 has a positive refractive power, and both surfaces thereof are convex. For example, first and second surfaces of the second lens 220 are convex in the paraxial region.

In addition, an absolute value of a radius of curvature of the first surface of the second lens 220 in the paraxial region is smaller than an absolute value of a radius of curvature of the second surface of the second lens 220 in the paraxial region.

The third lens 230 has a negative refractive power, and has a meniscus shape of which an object-side surface is convex. For example, a first surface of the third lens 230 is convex in the paraxial region, and a second surface of the third lens 230 is concave in the paraxial region.

The fourth lens 240 has a positive refractive power, and has a meniscus shape of which an image-side surface is convex. For example, a first surface of the fourth lens 240 is concave in the paraxial region, and a second surface of the fourth lens 240 is convex in the paraxial region.

The fifth lens 250 has a negative refractive power, and both surfaces thereof are concave. For example, first and second surfaces of the fifth lens 250 are concave in the paraxial region.

In addition, at least one inflection point is formed on at least one of the first and second surfaces of the fifth lens 250.

In addition, an absolute value of a radius of curvature of the second surface of the fifth lens 250 in the paraxial region is larger than an absolute value of a radius of curvature of the first surface of the fifth lens 250 in the paraxial region.

The sixth lens 260 has a negative refractive power, and has a meniscus shape of which an object-side surface is convex. For example, a first surface of the sixth lens 260 is convex in the paraxial region, and a second surface of the sixth lens 260 is concave in the paraxial region.

In addition, at least one inflection point is formed on at least one of the first and second surfaces of the sixth lens 260.

In addition, a radius of curvature of the second surface of the sixth lens 260 in the paraxial region is smaller than a radius of curvature of the first surface of the sixth lens 260 in the paraxial region.

Figure 5:
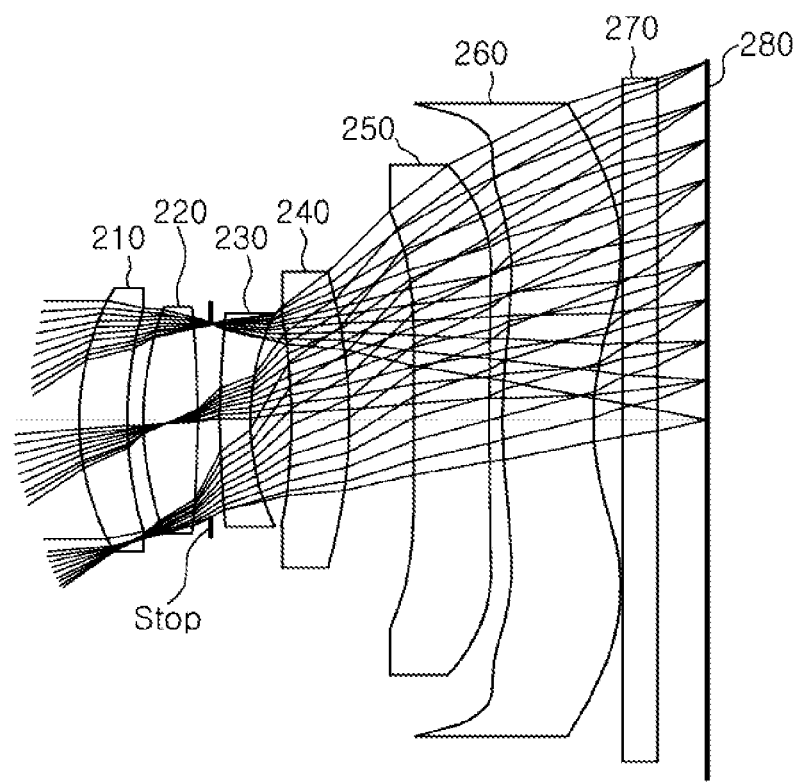
FIG. 5 is a configuration diagram of an optical system, according to a second embodiment.

Although FIG. 5 illustrates the sixth lens 260 to be in contact to the infrared cut-off filter 270, the sixth lens 260 may be placed at a distance from the infrared cut-off filter 270. In an alternative embodiment, the infrared cut-off filter 270 may be shaped to mirror the image-side surface or the second surface of the sixth lens 260, thereby forming an integral part of the sixth lens 260.

In accordance with an embodiment, the respective surfaces of the first to sixth lenses 210 to 260 have aspherical coefficients as illustrated in FIG. 8. However, a person of ordinary skill in the art will appreciate that some variation in the aspherical coefficients may exist without departing from the results and benefits of the present second embodiment.

In addition, among the first to sixth lenses 210 to 260, the fifth lens 250 has the largest absolute value of a focal length.

In addition, the stop is disposed between the second lens 220 and the third lens 230. In an alternative configuration, the stop may be disposed on an object side of the first lens 210, closest to the object side of the optical system. In a further alternative configuration, the stop may be disposed on the object side of the first lens 210 and is aligned along an axis perpendicular to an axial point of the object-side surface of the first lens 210.

Figure 6:
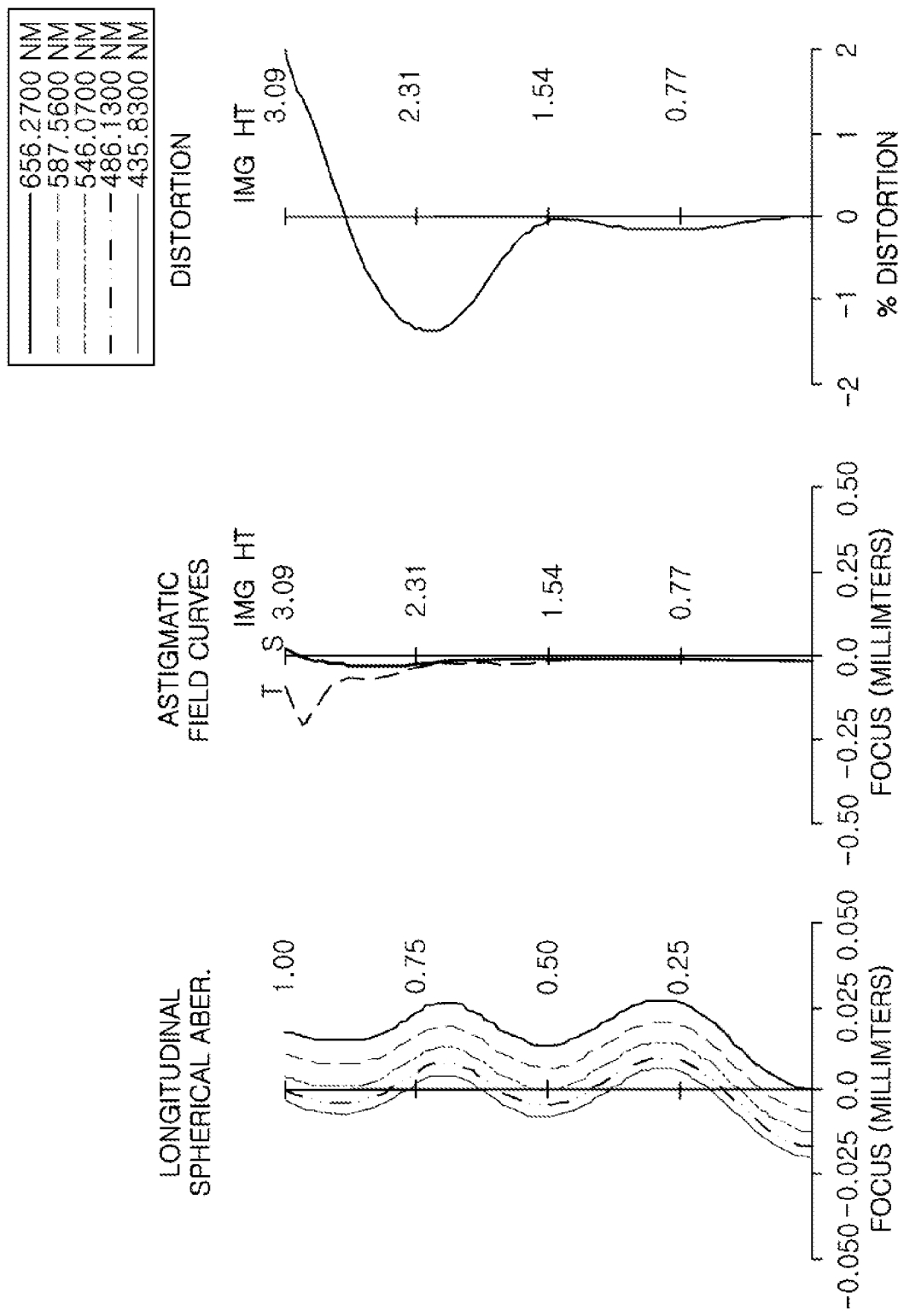
FIG. 6 is graphs having curves representing aberration characteristics of the optical system illustrated in FIG. 5.

In addition, the optical system configured as described above has aberration characteristics illustrated in FIG. 6. However, a person of ordinary skill in the art will appreciate that some variation in the aberration characteristics may exist without departing from the results and benefits of the present second embodiment.

An optical system according to a third embodiment will be described with reference to FIGS. 9 through 12.

The optical system according to the third embodiment includes a first lens 310, a second lens 320, a third lens 330, a fourth lens 340, a fifth lens 350, and a sixth lens 360. The optical system further includes a stop, an infrared cut-off filter 370, and an image sensor 380.

As illustrated in Table 3, a focal length (f1) of the first lens 310 is 8.245 mm, a focal length (f2) of the second lens 320 is 3.967 mm, a focal length (f3) of the third lens 330 is −4.126 mm, a focal length (f4) of the fourth lens 340 is 14.899 mm, a focal length (f5) of the fifth lens 350 is −143.125 mm, a focal length (f6) of the sixth lens 360 is −9.144 mm, and an overall focal length (f) of the optical system is 4.541 mm. Also, TTL, a distance from an object-side surface of the first lens 310 to an imaging surface of the image sensor 380 is 4.541. Further, Fno, which indicates how much light can pass through the lens, is 2.0.

TABLE 3

| Fno | 2 |
|---|---|
| TTL | 5.4 |
| f | 4.541 |
| f1 | 8.245 |
| f2 | 3.967 |
| f3 | −4.126 |
| f4 | 14.899 |
| f5 | −143.125 |
| f6 | −9.144 |
| Stop/f | 0.385 |
| TTL/f | 1.189 |
| (r9 − r10)/(r9 + r10) | −13.422 |

In this example, respective characteristics, such as radii of curvature, thicknesses, refractive indices, and Abbe numbers of lenses are illustrated in FIG. 11.

In the third embodiment, the first lens 310 has a positive refractive power, and has a meniscus shape of which an object-side surface is convex. For example, a first surface of the first lens 310 is convex in the paraxial region, and a second surface of the first lens 310 is concave in the paraxial region.

The second lens 320 has a positive refractive power, and both surfaces thereof may be convex. For example, first and second surfaces of the second lens 320 are convex in the paraxial region.

In addition, an absolute value of a radius of curvature of the first surface of the second lens 320 in the paraxial region is smaller than an absolute value of a radius of curvature of the second surface of the second lens 320 in the paraxial region.

The third lens 330 has a negative refractive power, and has a meniscus shape of which an object-side surface is convex. For example, a first surface of the third lens 330 is convex in the paraxial region, and a second surface of the third lens 330 is concave in the paraxial region.

The fourth lens 340 has a positive refractive power, and has a meniscus shape of which an image-side surface is convex. For example, a first surface of the fourth lens 340 is concave in the paraxial region, and a second surface of the fourth lens 340 is convex in the paraxial region.

The fifth lens 350 has a negative refractive power, and both surfaces thereof are concave. For example, first and second surfaces of the fifth lens 350 are concave in the paraxial region.

In addition, at least one inflection point is formed on at least one of the first and second surfaces of the fifth lens 350.

In addition, an absolute value of a radius of curvature of the second surface of the fifth lens 350 in the paraxial region is larger than an absolute value of a radius of curvature of the first surface of the fifth lens 350 in the paraxial region.

The sixth lens 360 has a negative refractive power, and has a meniscus shape of which an object-side surface is convex. For example, a first surface of the sixth lens 360 is convex in the paraxial region, and a second surface of the sixth lens 360 is concave in the paraxial region.

In addition, at least one inflection point is formed on at least one of the first and second surfaces of the sixth lens 360.

Figure 9:
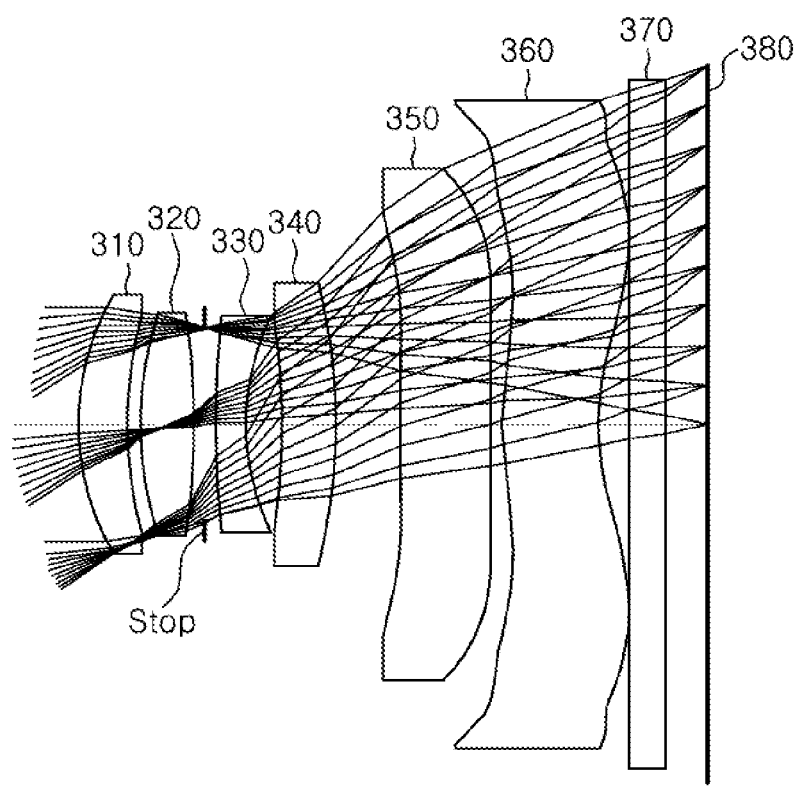
FIG. 9 is a configuration diagram of an optical system, according to a third embodiment.

In addition, a radius of curvature of the second surface of the sixth lens 360 in the paraxial region is smaller than a radius of curvature of the first surface of the sixth lens 360 in the paraxial region. Although FIG. 9 illustrates the sixth lens 360 to be in contact to the infrared cut-off filter 370, the sixth lens 360 may be placed at a distance from the infrared cut-off filter 370. In an alternative embodiment, the infrared cut-off filter 370 may be shaped to mirror the image-side surface or the second surface of the sixth lens 360, thereby forming an integral part of the sixth lens 360.

Meanwhile, the respective surfaces of the first to sixth lenses 310 to 360 have aspherical coefficients as illustrated in FIG. 12. However, a person of ordinary skill in the art will appreciate that some variation in the aspherical coefficients may exist without departing from the results and benefits of the present third embodiment.

In addition, among the first to sixth lenses 310 to 360, the fifth lens 350 has the largest absolute value of a focal length.

In addition, the stop is disposed between the second lens 320 and the third lens 330. In an alternative configuration, the stop may be disposed on an object side of the first lens 310, closest to the object side of the optical system. In a further alternative configuration, the stop may be disposed on the object side of the first lens 310 and is aligned along an axis perpendicular to an axial point of the object-side surface of the first lens 310.

Figure 10:
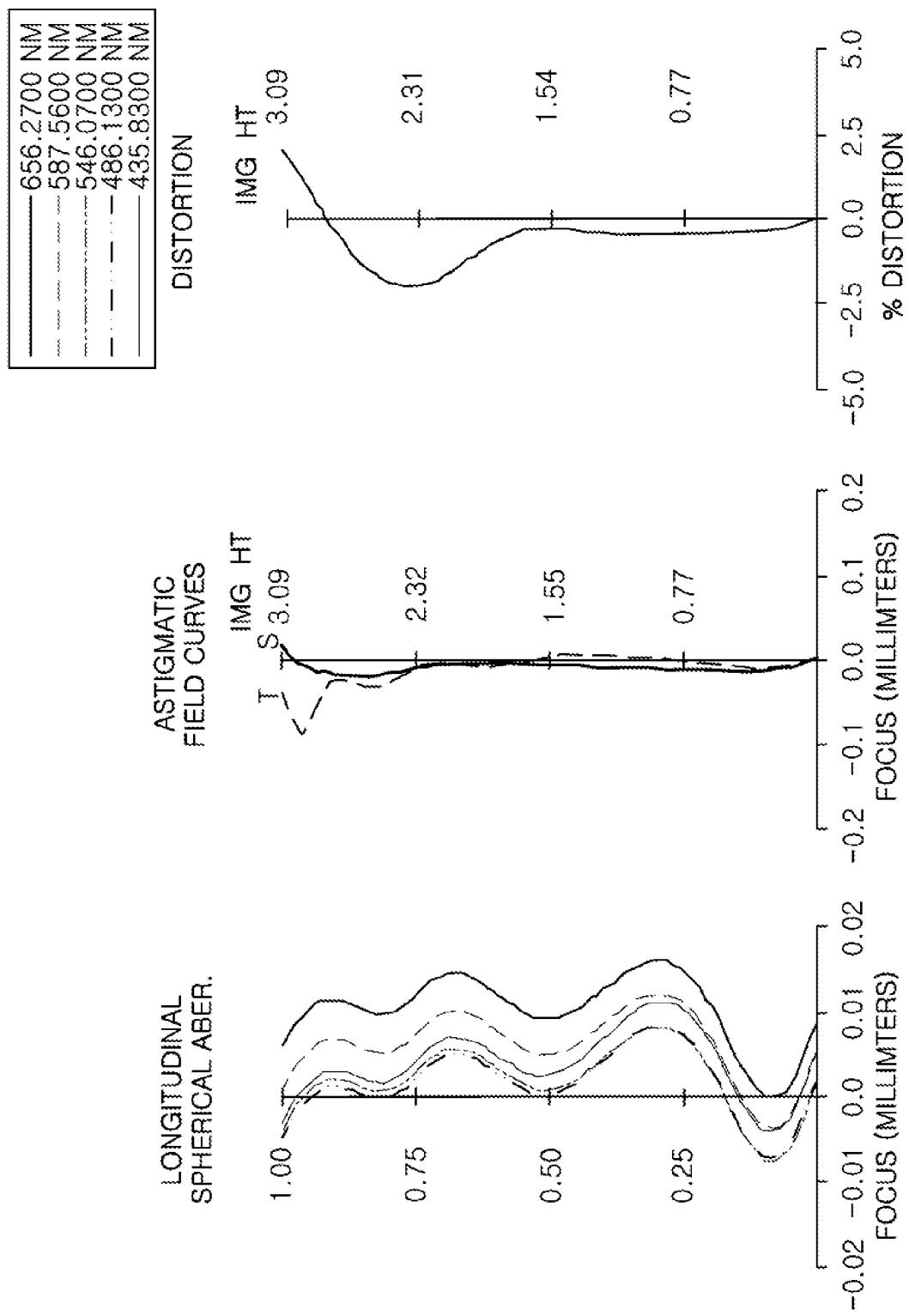
FIG. 10 is graphs having curves representing aberration characteristics of the optical system illustrated in FIG. 9.

In addition, the optical system configured as described above has aberration characteristics as illustrated in FIG. 10. However, a person of ordinary skill in the art will appreciate that some variation in the aberration characteristics may exist without departing from the results and benefits of the present third embodiment.

An optical system according to a fourth embodiment will be described with reference to FIGS. 13 through 16.

The optical system according to the fourth embodiment includes a first lens 410, a second lens 420, a third lens 430, a fourth lens 440, a fifth lens 450, and a sixth lens 460. The optical system also includes a stop, an infrared cut-off filter 470, and an image sensor 480.

As illustrated in Table 4, a focal length (f1) of the first lens 410 is 8.034 mm, a focal length (f2) of the second lens 420 is 3.996 mm, a focal length (f3) of the third lens 430 is −4.163 mm, a focal length (f4) of the fourth lens 440 is 16.369 mm, a focal length (f5) of the fifth lens 450 is −237.166 mm, a focal length (f6) of the sixth lens 460 is −9.251 mm, and an overall focal length (f) of the optical system is 4.526 mm. Also, TTL, a distance from an object-side surface of the first lens 410 to an imaging surface of the image sensor 480 is 4.526. Further, Fno, which indicates how much light can pass through the lens, is 2.2.

TABLE 4

| Fno | 2.2 |
|---|---|
| TTL | 5.4 |
| f | 4.526 |
| f1 | 8.034 |
| f2 | 3.996 |
| f3 | −4.163 |
| f4 | 16.369 |
| f5 | −237.166 |
| f6 | −9.251 |
| Stop/f | 0.386 |
| TTL/f | 1.193 |
| (r9 − r10)/(r9 + r10) | 1.877 |

In this example, respective characteristics, such as radii of curvature, thicknesses, refractive indices, and Abbe numbers of lenses are illustrated in FIG. 15.

In the fourth embodiment, the first lens 410 has a positive refractive power, and has a meniscus shape of which an object-side surface is convex. For example, a first surface of the first lens 410 is convex in the paraxial region, and a second surface of the first lens 410 is concave in the paraxial region.

The second lens 420 has a positive refractive power, and both surfaces thereof are convex. For example, first and second surfaces of the second lens 420 are convex in the paraxial region.

In addition, an absolute value of a radius of curvature of the first surface of the second lens 420 in the paraxial region is smaller than an absolute value of a radius of curvature of the second surface of the second lens 420 in the paraxial region.

The third lens 430 has a negative refractive power, and has a meniscus shape of which an object-side surface is convex. For example, a first surface of the third lens 430 is convex in the paraxial region, and a second surface of the third lens 430 is concave in the paraxial region.

The fourth lens 440 has a positive refractive power, and has a meniscus shape of which an image-side surface is convex. For example, a first surface of the fourth lens 440 is concave in the paraxial region, and a second surface of the fourth lens 440 is convex in the paraxial region.

The fifth lens 450 has a negative refractive power and both surfaces thereof are concave. For example, first and second surfaces of the fifth lens 450 are concave in the paraxial region.

In addition, at least one inflection point is formed on at least one of the first and second surfaces of the fifth lens 450.

In addition, an absolute value of a radius of curvature of the second surface of the fifth lens 450 in the paraxial region is larger than an absolute value of a radius of curvature of the first surface of the fifth lens 450 in the paraxial region.

The sixth lens 460 has negative refractive power, and has a meniscus shape of which an object-side surface is convex. For example, a first surface of the sixth lens 460 is convex in the paraxial region, and a second surface of the sixth lens 460 is concave in the paraxial region.

In addition, at least one inflection point is formed on at least one of the first and second surfaces of the sixth lens 460.

Figure 13:
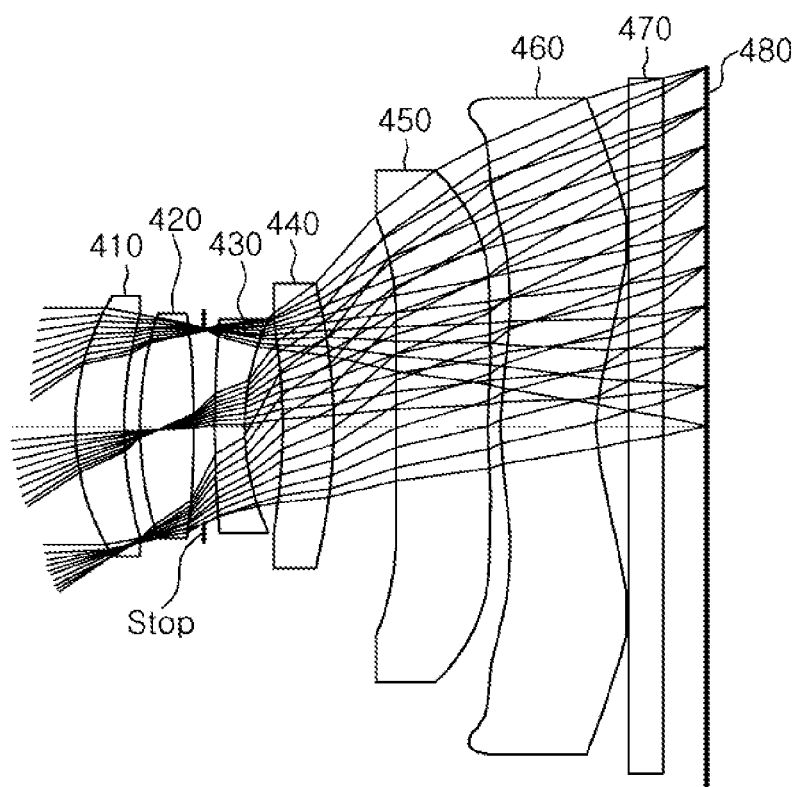
FIG. 13 is a configuration diagram of an optical system, according to a fourth embodiment.

In addition, a radius of curvature of the second surface of the sixth lens 460 in the paraxial region is smaller than a radius of curvature of the first surface of the sixth lens 460 in the paraxial region. Although FIG. 13 illustrates the sixth lens 460 to be in contact to the infrared cut-off filter 470, the sixth lens 460 may be placed at a distance from the infrared cut-off filter 470. In an alternative embodiment, the infrared cut-off filter 470 may be shaped to mirror the image-side surface or the second surface of the sixth lens 460, thereby forming an integral part of the sixth lens 460.

Furthermore, the respective surfaces of the first to sixth lenses 410 to 460 have aspherical coefficients as illustrated in FIG. 16. However, a person of ordinary skill in the art will appreciate that some variation in the aspherical coefficients may exist without departing from the results and benefits of the present third embodiment.

In addition, among the first to sixth lenses 410 to 460, the fifth lens 450 has the largest absolute value of a focal length.

In addition, the stop is disposed between the second lens 420 and the third lens 430. In an alternative configuration, the stop may be disposed on an object side of the first lens 410, closest to the object side of the optical system. In a further alternative configuration, the stop may be disposed on the object side of the first lens 410 and is aligned along an axis perpendicular to an axial point of the object-side surface of the first lens 410.

Figure 14:
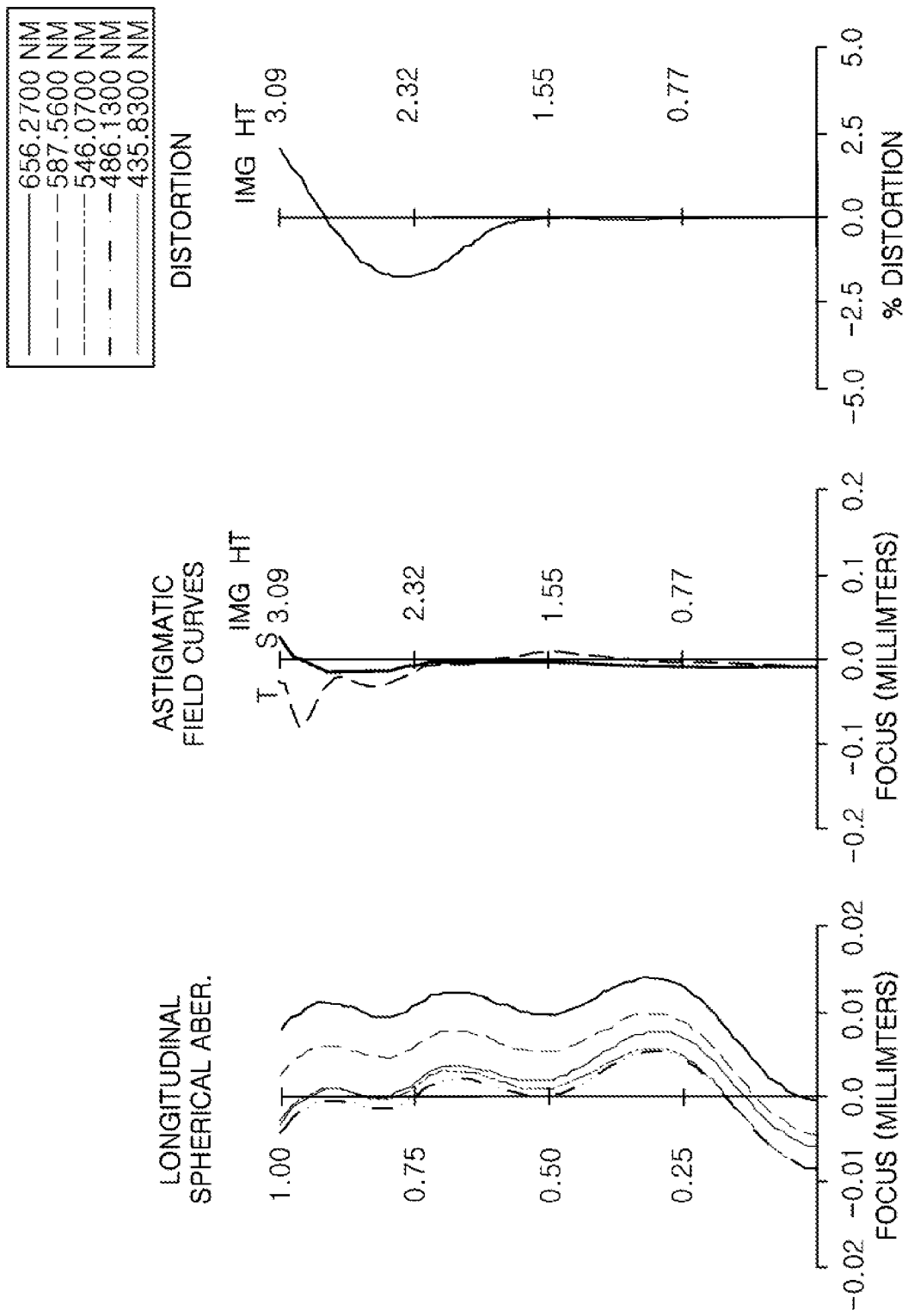
FIG. 14 is graphs having curves representing aberration characteristics of the optical system illustrated in FIG. 13.

In addition, the optical system configured as described above has aberration characteristics illustrated in FIG. 14. However, a person of ordinary skill in the art will appreciate that some variation in the aberration characteristics may exist without departing from the results and benefits of the present third embodiment.

An optical system according to a fifth embodiment in the present disclosure will be described with reference to FIGS. 17 through 20.

The optical system according to the fifth embodiment includes a first lens 510, a second lens 520, a third lens 530, a fourth lens 540, a fifth lens 550, and a sixth lens 560. The optical system also includes a stop, an infrared cut-off filter 570, and an image sensor 580.

As illustrated in Table 5, a focal length (f1) of the first lens 510 is 8.112 mm, a focal length (f2) of the second lens 520 is 3.989 mm, a focal length (f3) of the third lens 530 is −4.165 mm, a focal length (f4) of the fourth lens 540 is 15.535 mm, a focal length (f5) of the fifth lens 550 is −153.086 mm, a focal length (f6) of the sixth lens 560 is −9.084 mm, and an overall focal length (f) of the optical system is 4.514 mm. Also, TTL, a distance from an object-side surface of the first lens 510 to an imaging surface of the image sensor 580 is 5.4. Further, Fno, which indicates how much light can pass through the lens, is 1.95.

TABLE 5

| | |
|---|---|
| Fno | 1.95 |
| TTL | 5.4 |
| f | 4.514 |
| f1 | 8.112 |
| f2 | 3.989 |
| f3 | −4.165 |
| f4 | 15.535 |
| f5 | −153.086 |
| f6 | −9.084 |
| Stop/f | 0.3466 |
| TTL/f | 1.196 |
| (r9 − r10)/(r9 + r10) | 1.022 |

In this example, respective characteristics, such as radii of curvature, thicknesses, refractive indices, and Abbe numbers of lenses are illustrated in FIG. 19.

In the fifth embodiment, the first lens 510 has a positive refractive power, and has a meniscus shape of which an object-side surface is convex. For example, a first surface of the first lens 510 is convex in the paraxial region, and a second surface of the first lens 510 is concave in the paraxial region.

The second lens 520 has a positive refractive power and both surfaces thereof are convex. For example, first and second surfaces of the second lens 520 are convex in the paraxial region.

In addition, an absolute value of a radius of curvature of the first surface of the second lens 520 in the paraxial region is smaller than an absolute value of a radius of curvature of the second surface of the second lens 520 in the paraxial region.

The third lens 530 has a negative refractive power and has a meniscus shape of which an object-side surface is convex. For example, a first surface of the third lens 530 is convex in the paraxial region, and a second surface of the third lens 530 is concave in the paraxial region.

The fourth lens 540 has a positive refractive power, and has a meniscus shape of which an image-side surface is convex. For example, a first surface of the fourth lens 540 is concave in the paraxial region, and a second surface of the fourth lens 540 is convex in the paraxial region.

The fifth lens 550 has a negative refractive power, and both surfaces thereof are concave. For example, first and second surfaces of the fifth lens 550 are concave in the paraxial region.

In addition, at least one inflection point is formed on at least one of the first and second surfaces of the fifth lens 550.

In addition, an absolute value of a radius of curvature of the second surface of the fifth lens 550 in the paraxial region is larger than an absolute value of a radius of curvature of the first surface of the fifth lens 550 in the paraxial region.

The sixth lens 560 has a negative refractive power, and has a meniscus shape of which an object-side surface is convex. For example, a first surface of the sixth lens 560 is convex in the paraxial region, and a second surface of the sixth lens 560 is concave in the paraxial region.

In addition, at least one inflection point may be formed on at least one of the first and second surfaces of the sixth lens 560.

Figure 17:
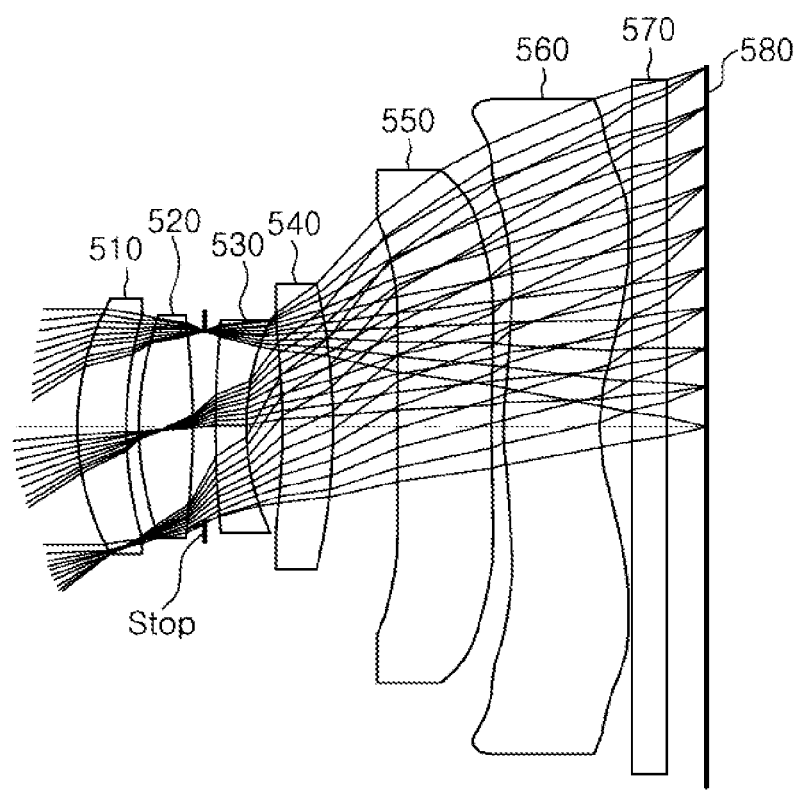
FIG. 17 is a configuration diagram of an optical system, according to a fifth embodiment.

In addition, a radius of curvature of the second surface of the sixth lens 560 in the paraxial region is smaller than a radius of curvature of the first surface of the sixth lens 560 in the paraxial region. Although FIG. 17 illustrates the sixth lens 560 to be in contact to the infrared cut-off filter 570, the sixth lens 560 may be placed at a distance from the infrared cut-off filter 570. In an alternative embodiment, the infrared cut-off filter 570 may be shaped to mirror the image-side surface or the second surface of the sixth lens 560, thereby forming an integral part of the sixth lens 560.

Meanwhile, the respective surfaces of the first to sixth lenses 510 to 560 have aspherical coefficients as illustrated in FIG. 20. However, a person of ordinary skill in the art will appreciate that some variation in the aspherical coefficients may exist without departing from the results and benefits of the present third embodiment.

In addition, among the first to sixth lenses 510 to 560, the fifth lens 550 has the largest absolute value of a focal length.

In addition, the stop is disposed between the second lens 520 and the third lens 530. In an alternative configuration, the stop may be disposed on an object side of the first lens 510, closest to the object side of the optical system. In a further alternative configuration, the stop may be disposed on the object side of the first lens 510 and is aligned along an axis perpendicular to an axial point of the object-side surface of the first lens 510.

Figure 18:
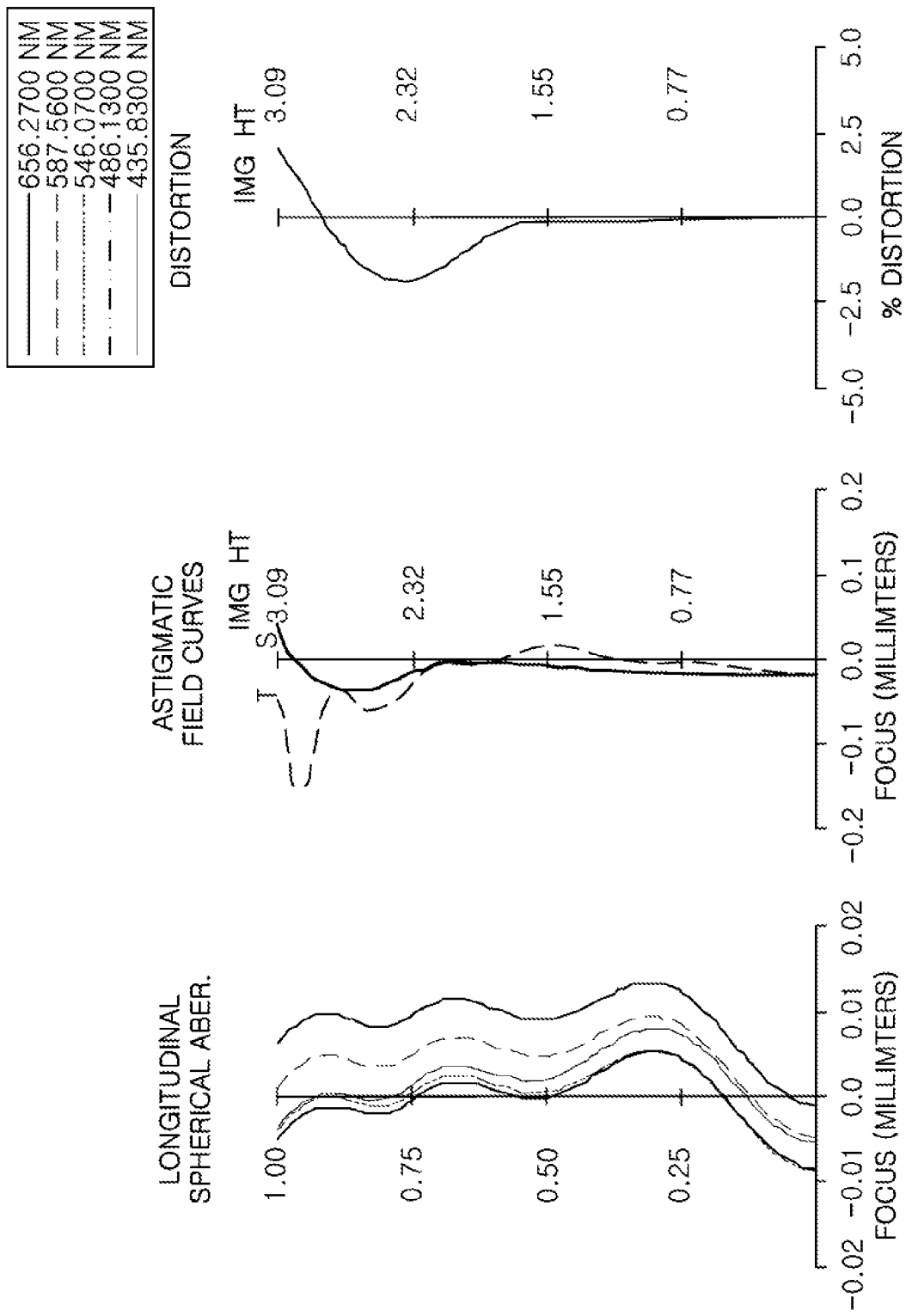
FIG. 18 is graphs having curves representing aberration characteristics of the optical system illustrated in FIG. 17.

In addition, the optical system configured as described above has aberration characteristics illustrated in FIG. 18. However, a person of ordinary skill in the art will appreciate that some variation in the aberration characteristics may exist without departing from the results and benefits of the present third embodiment.

As set forth above, in an optical system, according to embodiments, an aberration improvement effect is increased, and an increased amount of light is incident through lenses to an image sensor while images captured thereby have high levels of resolution.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical system, comprising:
a first lens having positive refractive power, a convex object-side surface and a concave image-side surface;
a second lens comprising a convex object-side surface;
a third lens comprising an object-side surface that is convex in the paraxial region;
a fourth lens comprising a concave object-side surface and a convex image-side surface;
a fifth lens having negative refractive power and an image-side surface that is concave in the paraxial region;
a sixth lens having negative refractive power, a convex object-side surface and a concave image-side surface; and
an image sensor converting an image incident through the first to sixth lenses into an electrical signal,
wherein the first to sixth lenses are sequentially disposed from an object side to an image side,
wherein TTL is a distance from an object-side surface of the first lens to an imaging surface of the image sensor and f is an overall focal length of the optical system including the first to sixth lenses satisfying TTL/f<1.35,
wherein an absolute value of a radius of curvature of the image-side surface of the fifth lens in the paraxial region is larger than an absolute value of a radius of curvature of an object-side surface of the fifth lens in the paraxial region,
wherein 1.5<f/f1+f/f2<2.0, where f1 is a focal length of the first lens and f2 is a focal length of the second lens,
wherein 0.4<f/f1<0.7,
wherein 1.0<f/f2<1.3,
wherein 1.0<|f/f3|<1.2, where f3 is a focal length of the third lens, and
wherein 0.2<f/f4<0.4, where f4 is a focal length of the fourth lens.

2. The optical system of claim 1, further comprising:
a stop disposed between the second and third lenses,
wherein, SD, a radius of the stop and, f satisfy SD/f<0.4.

3. The optical system of claim 1, wherein, r9, a radius of curvature of an object-side surface of the fifth lens and, r10, a radius of curvature of the image-side surface of the fifth lens satisfy, −30<(r9−r10)/(r9+r10)<3.

4. The optical system of claim 1, wherein 0.01<|f/f5|<0.07, where f5 is a focal length of the fifth lens.

5. The optical system of claim 1, wherein 0.4<|f/f6|<0.6, where f6 is a focal length of the sixth lens.

6. The optical system of claim 1, wherein 1.9<f1/f2<2.1.

7. The optical system of claim 1, wherein, f4 and f5, a focal length of the fifth lens satisfy 4.0<|f5/f4|<15.

8. The optical system of claim 1, wherein 0.4<|f/f5|+|f/f6|<0.6, where f5 is a focal length of the fifth lens and f6 is a focal length of the sixth lens.

9. The optical system of claim 1, wherein v1−v3>30, where v1 is an Abbe number of the first lens and v3 is an Abbe number of the third lens.

10. The optical system of claim 1, wherein v2−v3>30, where v2 is an Abbe number of the second lens and v3 is an Abbe number of the third lens.

11. The optical system of claim 1, wherein an absolute value of a radius of curvature of an object-side surface of the second lens in the paraxial region is smaller than an absolute value of a radius of curvature of an image-side surface of the second lens in the paraxial region.

12. The optical system of claim 1, wherein an image-side surface of the third lens is concave in the paraxial region.

13. The optical system of claim 1, wherein the fourth lens has a positive refractive power.

14. The optical system of claim 1, wherein an object-side surface of the fifth lens is concave in the paraxial region.

15. The optical system of claim 1, wherein among the first to sixth lenses, the fifth lens has a largest absolute value of a focal length.

16. The optical system of claim 1, wherein the fifth lens has at least one inflection point on at least one of an object-side surface and the image-side surface thereof.

17. The optical system of claim 1, wherein a radius of curvature of an image-side surface of the sixth lens in the paraxial region is smaller than a radius of curvature of an object-side surface of the sixth lens in the paraxial region.

18. The optical system of claim 1, wherein the sixth lens has at least one inflection point on at least one of an object-side surface and an image-side surface thereof.

19. The optical system of claim 1, wherein at least one of an object-side surface and an image-side surface of each of the first to sixth lenses is aspherical.

* * * * *